3,475,469
**13 - ALKYL - 9 - CHLOROMETHYLGON - 4-
EN-17β-OL-3-ONES AND INTERMEDIATES
THEREFOR**
Richard W. Rees, St. Davids, and Herchel Smith, Wayne,
Pa., assignors to American Home Products Corporation, New York, N.Y., a corporation of Delaware
No Drawing. Filed June 27, 1967, Ser. No. 649,142
Int. Cl. C07c *169/10, 169/06;* A61k *17/00*
U.S. Cl. 260—397.45                             6 Claims

ABSTRACT OF THE DISCLOSURE

13 - alkylgona - 5(10),9(11) - dien - 17β - ol - 3-one 17-esters (III) are reduced with sodium borohydride to provide novel 13-alkylgona-5(10),9(11)-dien-3ξ,17β-diol 17-esters (IIa). Compounds IIa are selectively methylenated at the 5(10) double bond to provide novel 13-alkylgona - 5,10ξ - methylenegona - 9(11) - en - 3,17 - diol 17-esters (IIb). Compounds IIb are oxidized to provide novel 13 - alkylgona - 5,10ξ - methylenegona - 9(11)-en-17β-ol-3-one 17-esters (IIc). Compounds IIc are treated with hydrogen chloride to provide novel 13-alkyl-9ξ-chloromethyl-gon-4-en-17β-ol-3-one 17-esters (I). The free 17β-ols of I and IIa–c are obtained by hydrolysis. Compounds I and IIa–c are hormonally-active.

This invention relates to valuable steroidal compounds of Formulae I and II:

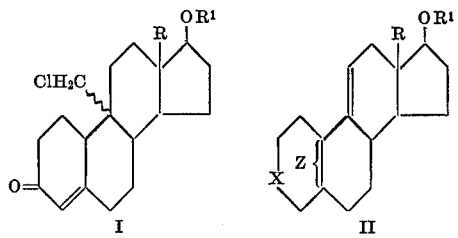

wherein

R is alkyl of from about 1 to about 18 carbon atoms;
R[1] is hydrogen or lower alkanoyl;
X is keto or hydroxymethylene; and
Z is a 5(10)-double bond or a 5(10)-methylene group when X is hydroxymethylene or a 5(10)-methylene group when X is keto or hydroxymethylene, the symbol (ξ) indicating α- or β-configuration. Compounds of Formulae I and II possess valuable hormonal activity, especially androgenic and anti-estrogenic actvity. In addition, compounds of Formula II are especially useful as intermediates in the preparation of the compounds of Formula I.

Illustrative of group R, attached to the 13-position, are straight and branched chain saturated alkyl groups having from about 1 to about 18 carbon atoms, such as methyl, ethyl, n-propyl, isopropyl, n-butyl, iso-butyl, t-butyl, n-pentyl, 2-ethylpropyl, hexyl, heptyl, decyl, dodecyl, octadecyl, and the like. The 17-lower alkanoyl group (R[1] in Formulae I and II) contains from about 2 to about 6 carbon atoms. The alkanoyl groups are, for example, derived from an alkyl carboxylic acid. The alkyl portion of an alkanoyl group may be a straight or branched chain group or a group having an aliphatic ring, with or without a substituent and it may be unsaturated. Illustrative of the group R[1] are acetyl, propionyl, trimethylacetyl, butyryl, isobutyryl, pentanoyl, isopentanoyl, hexanoyl, cyclopentylformyl, and the like. The acetyl group is preferred.

Preferred 17-esters are those wherein R is ethyl and OR[1] is acetoxy. Special mention is made of three particularly valuable embodiments of this invention: these are, respectively, a compound of Formula IIa:

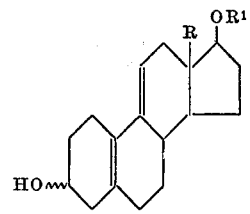

wherein R and R[1] are as defined above, especially 17β-acetoxy-13β-ethylgona-5(10),9(11)-dien - 3ξ - ol; a compound of Formula IIb:

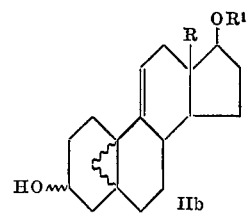

wherein R and R[1] are as defined above, especially 17β-acetoxy - 13β - ethyl - 5,10ξ - methylenegona - 9(11)-en-3ξ-ol; and a compound of Formula IIc:

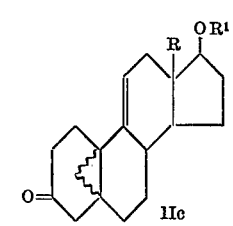

wherein R and R[1] are as defined above, especially 17β-acetoxy-13β-ethyl-5,10ξ-methylenegona-9(11)-en-3-one.

The new compounds of Formula I of this invention can be prepared from a 3-ketone of Formula IIc:

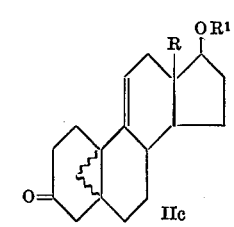

wherein R and R[1] are as defined above, by treatment with hydrochloric acid. If an alkanoyloxy group is present in the 17-position, and a hydroxyl group is desired, the ester group can be removed in a subsequent, optional step by conventional procedures. The novel rearrangement with the addition of the elements of hydrogen chloride is carried out by treating the steroid IIc with hydrogen chloride preferably dissolved in a solvent for both the steroid and the hydrogen chloride. Especially useful is to use a saturated solution of hydrogen chloride in chloroform. According to one method, the 3-ketone IIc is added to chloroform saturated with hydrogen chloride and the mixture is kept at about 25° C. for about 1.5 hours. The mixture is washed until neutral and evaporation of the solvents affords the product of Formula I as a crystalline residue. If desired, it can be further purified by recrystallization from a solvent, such as ether, acetone, and the like.

The new compounds of Formula IIc of this invention can be prepared from a ξ-ol of Formula IIb:

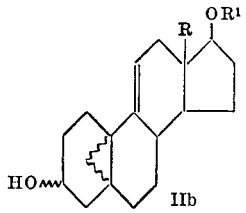

wherein R is as above defined and R¹ is lower alkanoyl, by oxidation until replacement of the 3ξ-ol group by a 3-one group is substantially complete and, optionally, when a compound wherein R¹ is hydrogen is required, removing the 17-alkanoyl group by hydrolysis in a conventional procedure. In this process the 3ξ-ol is oxidized in the presence of a suitable oxidizing agent, for example chromic acid or an obvious chemical equivalent thereof and preferably in the presence of an inert solvent, such as acetone. In one method, the 3ξ-ol is treated at room temperature, e.g., about 25° C., with 8 N-chromic acid in acetone, extracted with an organic solvent and the solvent evaporated to dryness. The product (IIc) remains as a residue and can be further purified by recrystallization, if desired.

The new compounds of Formula IIb of this invention can be prepared from a 3ξ-ol of Formula IIa:

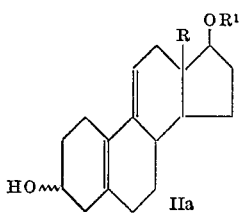

wherein R is as above defined and R¹ is lower alkanoyl, by selective methylenation of the 5(10)-double bond and, optionally, when a compound wherein R¹ is hydrogen is required, removing the 17-alkanoyl group by hydrolysis in a conventional procedure. In this process the 5(10) double bond is methylenated, for example with a metal and methylene halide, e.g., a zinc-copper couple and methylene iodide, $CH_2I_2$. The methylenation is preferably carried out in an inert organic solvent, such as ethyl ether and at a moderately elevated temperature, for example about 80 to about 100° C., preferably about 90° C. until the reaction is substantially complete, in most instances about 3 hours is sufficient. According to one method, the compound of Formula IIa is reacted with about 5 times its weight of a zinc-copper couple and about 10 times its weight of methylene iodide in about 75 parts by volume of ether. The reaction is carried out at 90° C. in an autoclave and after three hours, the mixture is cooled and triturated with more ether. Filtration of the crystalline precipitate affords the compound of Formula IIb. It can be purified, if desired, by chromatography on neutral alumina.

The new compounds of Formula IIa of this invention can be prepared from a 3-one of Formula III:

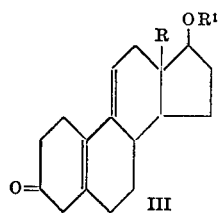

wherein R is as defined above and R¹ is lower alkanoyl, by selective reduction of the 3-one group to a 3ξ-ol group and, optionally, when a compound wherein R¹ is hydrogen is required, removing the 17-alkanoyl group by hydrolysis in a conventional procedure. In this process the 3-one is treated with a reducing agent, for example with sodium borohydride, lithium tri-t-butoxy aluminum hydride or an obvious chemical equivalent thereof. The selective reduction preferably is carried out in an inert organic solvent, such as, for example methanol or tetrahydrofuran and at low to moderate temperature, e.g. from about 0° C. to about 25° C., until replacement by a 3ξ-ol group is substantially complete; about two hours usually is adequate. In one procedure, the 3-one of Formula III is suspended in about 20 parts by weight of methanol containing an amount of sodium borohydride equal in weight to the steroid, then the mixture is kept at 0° C. for 1 hour and at 25° C. for 1 hour. The product of Formula IIa is recovered by treating the mixture with ice, then extracting it with chloroform. Evaporation of the chloroform leaves the product as a residue which can, if desired, be further purified by recrystallization from a solvent.

Starting materials of Formula III are obtained by procedures outlined in the art or readily derivable therefrom by those skilled in the art. For example, compounds of Formula III wherein R is methyl and R¹ is hydrogen or lower alkanoyl are described in U.S. 3,052,672. One process which can be employed involves treating a 13β-alkylgona-5(10)-en-17β-ol-3-one 17-ester with bromine, dehydrobrominating, converting the resulting 13β-alkylgona-4,9(10)-dien-3-one to a 3-enamine and hydrolyzing the enamine for a short time with formic acid. The 13β-polycarbonalkyl-5(10)-en-17β-ol-3-one 17 esters (R is $C_2$ to $C_{18}$) are obtained by esterifying the corresponding 17β-ols, which are obtained by methods disclosed and exemplified in detail in copending application Ser. No. 540,930, filed Apr. 7, 1966 now U.S. Patent No. 3,391,165. The 17-hydroxy group may be alkanoylated with an appropriate acylating agent, for example, the acid, acid anhydride or ester of the acylating acid with a lower alcohol, in a suitable medium and heating if necessary. Alkanoylation may, in general, be effected by reaction of an acyl chloride, for example, acetyl chloride, with the 17-hydroxy compound in the presence of a base, e.g., pyridine.

The androgenic and anti-estrogenic activity of the instant compounds makes them of use in the treatment of conditions commonly treated with androgenically and anti-estrogenically-active hormones. Among these conditions might be mentioned, for example, male hormonal deficiencies arising from hypofunction, loss or atrophy of testes and dysmenorrhea and menopausal symptoms in females.

The invention in its broadest aspects includes pharmaceutical compositions comprising a compound of Formulae I or II and a pharmaceutically acceptable carrier. The pharmaceutically acceptable carrier can be either solid or liquid. Solid form preparations include powders, tablets, dispersible granules, capsules, cachets and suppositories. A solid carrier can be one or more substances which may also act as flavoring agents, solubilizers, lubricants, suspending agents, binders or tablet-disintegrating agents; it can also be an encapsulating material. In powders, the carrier is a finely divided solid which is in admixture with the finely divided compounds. In tablets the compound is mixed with a carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, cocoa butter, and the like. The term "composition" is intended to include the formulation of the compound with encapsulating material as carrier providing a capsule in which the compound (with or without other carriers) is surrounded by carrier, which is thus in association with it. Similarly, cachets, which are typically flour-paste cases in which medicines are often swallowed, are included. Tablets, powders, cachets and capsules can be used for oral administration.

Liquid form preparations include solutions, suspensions and emulsions. The instant compounds are insoluble in water but can be dissolved in aqueous propylene glycol solutions for parenteral injection. They can also be formulated in solution in aqueous solutions of polyethylene glycol of molecular weight of about 400. Aqueous suspensions suitable for oral use can be made by dispersing the finely divided compound in water with sodium carboxymethyl cellulose as suspending agent. Oily suspensions can be prepared by dispersing the finely-divided compound in arachis oil.

Preferably, the pharmaceutical composition is in unit dosage form. In such form, the preparation is subdivided in unit doses containing appropriate quantities of the compound. The suit dosage form can be a packaged preparation, the package containing discrete quantities of preparation, for example packeted powders, vials or ampules. The unit dosage form can be a capsule, cachet or tablet itself, or it can be the appropriate number of any of these in packaged form. The quantity of compound in a unit dose of preparation may be varied or adjusted for axample from 0.5 mg. to 100 mg. (generally within the range of 0.5 to 25 mg.) according to the particular application and the potency of the active ingredient.

In the product of a total synthesis which has not included a suitable resolution step, the compounds of this invention, which have the 13β-configuration, will be present in equimolar mixture of racemate form with the corresponding 13α-enantiomers.

DESCRIPTION OF THE PREFERRED EMBODIMENTS

The following examples illustrate typical compounds within the scope of this invention.

EXAMPLE 1

17β-acetoxy-13β-ethylgona-5(10),9(11)-dien-3ξ-ol (a) 17β - acetoxy - 13β-ethylgona-5(10)-en-3-one.— 17β - hydroxy-13β-ethylgona-5(10)-en-3-one [H. Smith, G. A. Hughes, G. H. Douglas, D. Hartley, B. J. McLoughlin, and J. B. Siddall; G. R. Wendt, G. C. Buzby, Jr., D. R. Herbst, K. W. Ledig, J. R. McMenamin, T. W. Pattison, J. Suida, J. Tokolics, and R. A. Edgren; A. B. A. Jansen, B. Gadsby, D. H. R. Watson and P. C. Phillips, Experientia, 19, 394 (1936), 70 g.] is kept overnight at 25° C. in acetic anhydride-pyridine (350:400 ml.). The product is recrystallized from hexane-ether to give the acetate (50.0 g.), M.P., 110–114° C. after a second recrystallization from hexane-ether.

(b) 17β - acetoxy-13β-ethylgona-4,9-dien-3-one.—The product of step (a), 35 g., is heated on a steam bath for one hour with 36 g. of perbromopyridine hydrobromide in 350 ml. of pyridine. The cooled mixture is filtered, the filtrate is evaporated and the residue is dissolved in benzene. The solution is washed with 2 N hydrochloric acid and with water, dried, and evaporated to an oil which is recrystallized from ether to give 23 g. of the product, M.P., 124–127° C.

(c) 17β - acetoxy - 13β-ethyl-3-1′-pyrrolidinogona-3,5 (10),9(11)-triene.—The product of step (b) and 20 ml. of pyrrolidine are heated for 5 minutes on a steam bath. The solution is diluted with 200 ml. of methanol and is heated for 20 minutes. Filtration of the colored solution provides 23 g. of the enamine product 154–174° C. Recrystallization from methanol raises the melting point to 164–174° C.

(d) 17β - acetoxy - 13β-ethyl-17β-hydroxygona-5(10), 9(11)-dien-3-one.—The product of step (c), 22 g., is kept at room temperature for 3 minutes in 30 ml. of 98% formic acid. Then 100 ml. of water is added and after a further 20 minutes the mixture is extracted with ether. Recrystallization of the residue, after evaporation of the ether, from hexane, affords 14.4 g. of the product, M.P. 80–86° C.

(e) 17β - acetoxy - 13β-ethylgona-5(10),9(11)-dien-3ξ-ol.—The product of step (d), 6.0 g., is kept in 100 ml. of methanol containing 6 g. of sodium borohydride for one hour at 0° C. and then for one hour at 25° C. Decomposition of the mixture with ice and extraction with chloroform affords 4.2 g. of the product, which comprises the 3α- and the 3β-ols in admixture. UV, λ$_{max}$ 237 (shoulder), 242.5, 251 (shoulder) mμ (ε 18,852; 19,820; 13,070). NMR, 3 proton triplet 0.92, J, 6.5 cps. (18a-H); 3 proton singlet δ 2.08 (acetate-CH$_3$); 1 proton multiplet (broad) 3.92 (3ξ-H); 1 proton triplet δ 4.80, J, 8 cps. (17α-H); 1 proton doublet, J, 5.5 cps. (11-H).

EXAMPLE 2

13-β-ethylgona-5(10),9(11)-diene-3ξ-17β-diol

The compound of Example 1, step (e), 1.0 g., is reacted in methanol-10% saturated KHCO$_3$ solution overnight. Recrystallization of the residue, after evaporation of the solvents, from acetone-ether yields the product.

EXAMPLE 3

The procedures of Examples 1 and 2 are used with stoichiometrically equivalent amounts of the corresponding 13-alkylgona-5(10),9(11)-dien-3-ones and the following compounds within the scope of this invention are obtained.

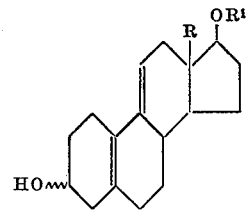

| R: | R$^1$ |
|---|---|
| CH$_3$ | H |
| CH$_3$ | CH$_3$CO |
| CH$_3$CH$_2$ | CH$_3$(CH$_2$)$_4$CO |
| CH$_3$CH$_2$ | (CH$_3$)$_2$CHCO |
| CH$_3$CH$_2$CH$_2$ | CH$_3$CO |
| CH$_3$(CH$_2$)$_2$CH$_2$ | CH$_3$CO |
| CH(CH$_3$)$_2$ | CH$_3$CO |
| CH$_2$CH(CH$_3$)$_2$ | CH$_3$CO |
| CH$_3$(CH$_2$)$_{16}$CH$_2$ | CH$_3$CO |
| CH$_3$(CH$_2$)$_{16}$CH$_2$ | H |

EXAMPLE 4

17β-acetoxy-13β-ethyl-5,10ξ-methylene-gona-9(11)-en-3ξ-ol

A mixture of 17β - acetoxy - 13β - ethylgona - 5(10), 9(11)-dien-3α- and 3β-ol, 2.0 g., is reacted with 10 g. of a zinc-copper couple [prepared according to E. Le Goff, J. Org. Chem., 29, 2048 (1964)] and 20 g. of methylene diiodide in 150 ml. of ether for one hour and the mixture is heated in an autoclave for three hours at 90° C. Trituration of the crude product with ether affords 120 mg. of the product, M.P. 170–180° C. NMR: 2 porton singlet 0.70 (19-H); 3 proton triplet 0.93, J, 6.5 cps. (18a-H); 3 proton singlet 2.04 (acetates-CH$_3$); 1 proton multiplet 3.63 (broad) half-weight width 30 cps. (3-H); 1 proton triplet 4.82, J, 8 cps. (17α-H); 1 proton doublet 5.43, J, 5.5 cps. (11-H). The mother liquors are chromatographed on 60 g. of neutral alumina. Eluting with benzene-ethyl acetate (9:1) affords 510 mg. of 17β-acetoxy-13β-ethyl- 5,10α-methylene-gona-9(11)-en-3α-ol as a gum. NMR: 2 proton singlet 0.55 (19-H); 3 proton triplet 0.97, J, 6.5 cps. (18a-H); 3 proton singlet 2.10 (acetate-CH₃); 1-proton multiplet 3.63 (broad) half height width 30 cps. (3-H); 1 proton triplet 4.91, J, 8 cps. (17α-H); 1 proton doublet 5.72, J, 5.5 cps. (11-H). Further elution of the column with benzene-ethyl acetate affords another 40 mg. of the 3β-compound.

EXAMPLE 5

13β-ethyl-5,10-methylene-gona-9(11)-en-3β,17β-diol and 13β-ethyl-5,10α-methylene-gona-9(11)-en-3α,17β-diol The respective 3α- and 3β-ols of Example 4, 1.0 g., are reacted at room temperature in methanol-10% saturated KHCO₃ solution overnight. Recrystallization of the residue, after evaporation of the solvents, from acetone-ether, yields the products.

EXAMPLE 6

The procedures of Examples 4 and 5 are used with stoichiometrically-equivalent amounts of the corresponding 13-alkylgona-5(10),9(11) - diene - 3,17-diols of Example 3 and the following compounds within the scope of this invention are obtained.

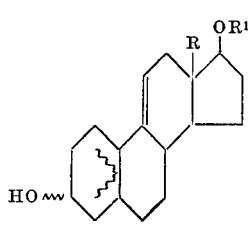

| R: | R¹ |
|---|---|
| CH₃ | H |
| CH₃ | CH₃CO |
| CH₃CH₂ | CH₃(CH₂)₄CO |
| CH₃CH₂ | (CH₃)₂CHCO |
| CH₃CH₂CH₂ | CH₃CO |
| CH₃(CH₂)₂CH₂ | CH₃CO |
| CH(CH₃)₂ | CH₃CO |
| CH₂CH(CH₃)₂ | CH₃CO |
| CH₃(CH₂)₁₆CH₂ | CH₃CO |
| CH₃(CH₂)₁₆CH₂ | H |

EXAMPLE 7

17β - acetoxy - 13β - ethyl - 5,10α - methylene - gona-9, (11)-en-3-one and 17β - acetoxy - 13β - ethyl - 5,10β-methylene-gona-9(11)-en-3-one 7β - acetoxy - 13β - ethyl - 5,10α - methylene-gona-9 (11)-en-3α-ol, 40 mg., is oxidized by adding dropwise 0.04 ml. of 8 N chromic acid [C. Djerassi, R. R. Engle and A. Bowers, J. Org. Chem., 21, 1547 (1956)] to a solution of the steroid in 10 ml. of acetone. Stirring is continued for 30 minutes and propan-2-ol is added dropwise until a green color persists. The solvents are evaporated and the residue is recrystallized from acetone-hexane to give 32 mg. of the 5,10α-methylene product. NMR: 2 proton AB system pair of doublets δ 0.55 and 0.80, J, 5.5 cps. (19-H); 3 proton triplet δ 0.97, J, 6.5 cps. (18a-H); 3 proton singlet δ 2.08 (acetate-CH₃); 2 proton singlet δ 2.52 (4-H); 1 proton triplet δ 4.80, J, 8 cps. (17a-H); 1 proton doublet δ 5.70, 6 cps. (11-H).

By the same procedure, 17β-acetoxy-13β-ethyl-5,10β-methylene-gona-9(11)-en-3β-ol is oxidized to the 5,10β-methylene steroid.

EXAMPLE 8

13β - ethyl - 5,10α - methylene - gona - 9(11) - en - 17β-ol-3-one and 13β - ethyl -5,10β - methylene - gona - 9 (11)-en-17β-ol-3-one The respective 5,10α-methylene and 5,10β-methylene steroids of Example 7, 1.0 g., are reacted at room temperature in methanol-10% saturated KHCO₃ solution overnight. Recrystallization of the residue, after evaporation of the solvents, from acetone-ether, yields the products.

EXAMPLE 9

The procedure of Examples 7 and 8 are used with stoichiometrically-equivalent amounts of the corresponding 13-alkyl-4,10-methylene-gona-9(11)-en - 3,17β - diol 17-esters of Example 6 and the following compounds within the scope of this invention are obtained.

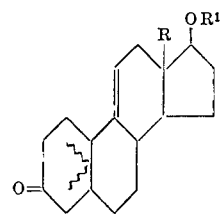

| R: | R¹ |
|---|---|
| CH₃ | H |
| CH₃ | CH₃CO |
| CH₃CH₂ | CH₃(CH₂)₄CO |
| CH₃CH₂ | (CH₃)₂CHCO |
| CH₃CH₂CH₂ | CH₃CO |
| CH₃(CH₂)₂CH₂ | CH₃CO |
| CH(CH₃)₂ | CH₃CO |
| CH₂CH(CH₃)₂ | CH₃CO |
| CH₃(CH₂)₁₆CH₂ | CH₃CO |
| CH₃(CH₂)₁₆CH₂ | H |

EXAMPLE 10

17β-acetoxy-13β-ethyl-9-chloro-methyl-gona-4-en-3-one

17β-acetoxy-13β-ethyl-5,10α - methylene-gona - 9(11)-en-3-one, 20 mg., is kept for 1.5 hours at room temperature in chloroform saturated with hydrogen chloride. The solvents are evaporated and the crystalline residue is recrystallized first from ether, hten from acetone to give 16 mg. of product, M.P. 161–164° C. VU,λ_max 242 mμ (ε 13,000); NMR: 3 proton triplet δ 0.98; J, 6.5 cps. (18a-H); 3 proton singlet δ 2.04 (acetate-CH₃); 2 proton AB system, pair of doublets δ 3.42 and 3.68, J, 11 cps. (9a-H); 1 proton broad singlet δ 5.95, half height width 5 cps. (4-H).

*Analysis.*—Calcd. for C₂₂H₃₁O₃Cl: C, 9.35. Found: Cl, 9.9.

EXAMPLE 11

13β-ethyl-9-chloromethyl-gona-4-en-17β-ol-3-one

The compound of Example 10, 1.0 g., is reacted at room temperature in methanol-10% saturated KHCO₃ solution overnight. Recrystallization of the residue, after evaporation of the solvents, from acetone-ether yields the product.

EXAMPLE 12

The procedures of Examples 10 and 11 are used with stoichiometrically-equivalent amounts of the corresponding 13 - alkyl-5,10ξ - methylene-gona - 9(11)-en - 17β-ol-3-one 17-esters of Example 9 and the following compounds within the scope of this invention are obtained.

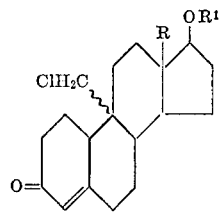

| R: | R¹ |
|---|---|
| $CH_3$ | H |
| $CH_3$ | $CH_3CO$ |
| $CH_3CH_2$ | $CH_3(CH_2)_4CO$ |
| $CH_3CH_2$ | $(CH_3)_2CHCO$ |
| $CH_3CH_2CH_2$ | $CH_3CO$ |
| $CH_3(CH_2)_2CH_3$ | $CH_3CO$ |
| $CH(CH_3)_2$ | $CH_3CO$ |
| $CH_2CH(CH_3)_2$ | $CH_3CO$ |
| $CH_3(CH_2)_{16}CH_2$ | $CH_3CO$ |
| $CH_3(CH_2)_{16}CH_2$ | H |

What is claimed is:

1. A compound of the formula:

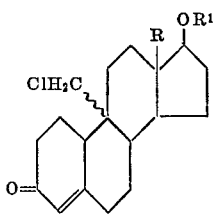

wherein
R is alkyl of from about 1 to about 18 carbon atoms and
R¹ is hydrogen or lower alkanoyl, the symbol (ξ) indicating α- or β-configuration.

2. A compound as defined in claim 1 which is 17β-acetoxy-13β-ethyl-9ξ-chloromethyl-gona-4-en-3-one.

3. A compound of the formula:

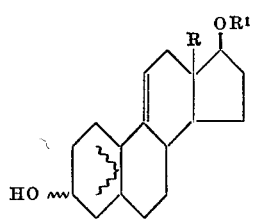

wherein
R is alkyl of from about 1 to about 18 carbon atoms and
R¹ is hydrogen or lower alkanoyl, the symbol (ξ) indicating α- or β-configuration.

4. A compound as defined in claim 3 which is 17β-acetoxy - 13β - ethyl - 5,10ξ - methylenegona - 9(11) - en-3ξ-ol.

5. A compound of the formula:

wherein
R is alkyl of from about 1 to about 18 carbon atoms and
R¹ is shydrogen or lower alkanoyl, the symbol (ξ) indicating α- or β-configuration.

6. A compound as defined in claim 5 which is 17β-acetoxy-13β-ethyl-5,10ξ-methylenegona-9(11)-en-3-one.

References Cited
UNITED STATES PATENTS

| | | | |
|---|---|---|---|
| 3,143,557 | 8/1964 | Brown et al. | 260—397.5 |
| 3,282,785 | 11/1966 | Joly et al. | 167—65 |
| 3,332,968 | 7/1967 | Joly et al. | 260—397.3 |

HENRY A. FRENCH, Primary Examiner

U.S. Cl. X.R.

260—239.5, 397.4, 397.5, 999

FO-1050
(5/69)

UNITED STATES PATENT OFFICE
CERTIFICATE OF CORRECTION

Patent No. 3,475,469                    Dated  October 28, 1969

Inventor(s) Richard W. Rees and Herchel Smith

It is certified that error appears in the above-identified patent and that said Letters Patent are hereby corrected as shown below:

Column 7, Example 6 formula should appear as follows:

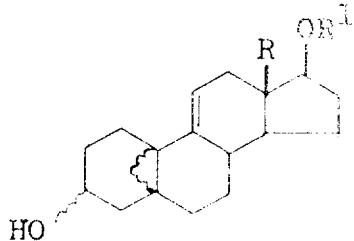

Column 8, Example 9 formula should appear as follows:

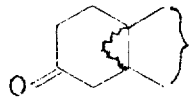

Column 9, Claim 3 formula should appear as follows:

Column 10, Claim 5 formula should appear as follows:

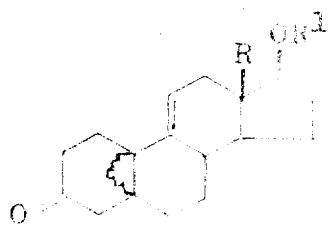

SIGNED AND
SEALED
MAY 12 1970

(SEAL)
Attest:

Edward M. Fletcher, Jr.
Attesting Officer

WILLIAM E. SCHUYLER, JR.
Commissioner of Patents